UNITED STATES PATENT OFFICE.

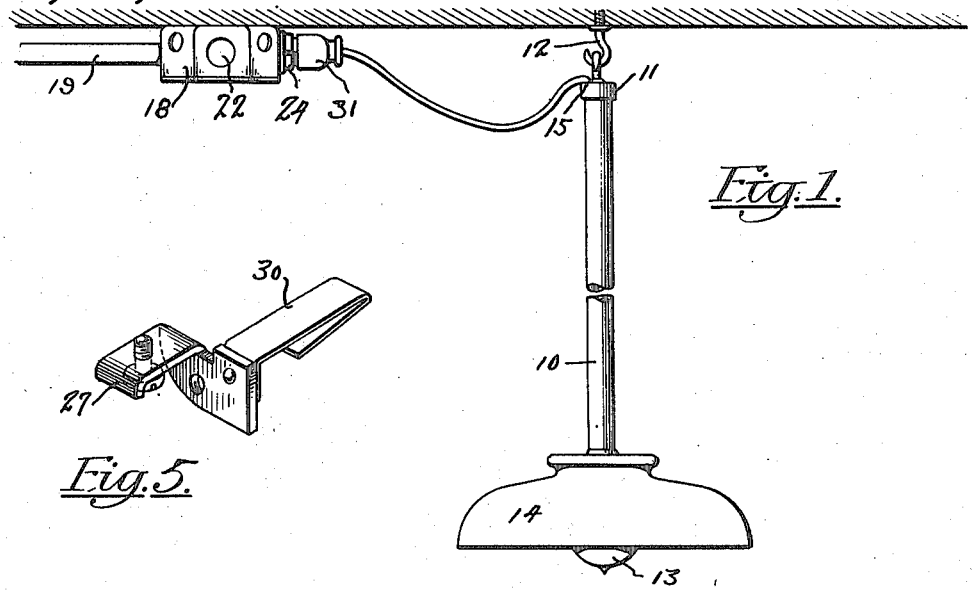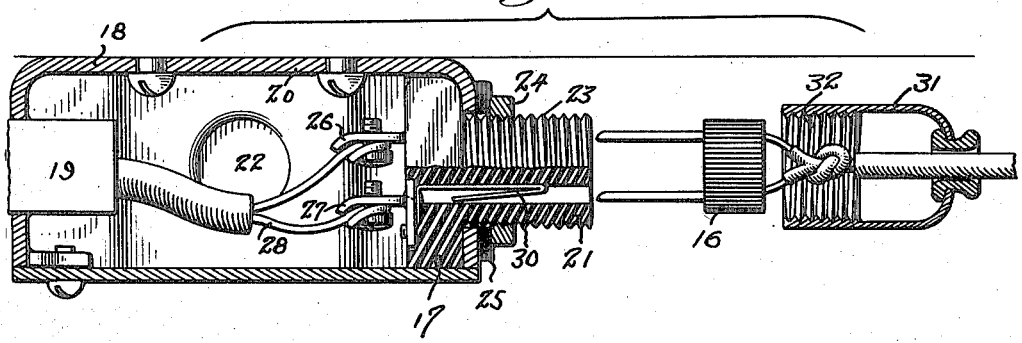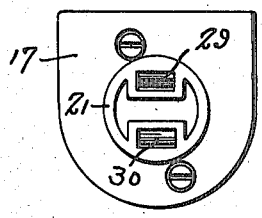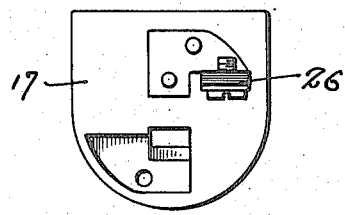

ALLAN COGGESHALL, OF PLEASANTVILLE, AND HENRY C. SCHNAKE, OF NEW YORK, N. Y., ASSIGNORS TO THE BRYANT ELECTRIC COMPANY, OF BRIDGEPORT, CONNECTICUT, A CORPORATION OF CONNECTICUT.

OUTLET-BOX FITTING.

1,233,188.   Specification of Letters Patent.   Patented July 10, 1917.

Application filed February 2, 1916. Serial No. 75,816.

*To all whom it may concern:*

Be it known that we, ALLAN COGGESHALL, a citizen of the United States of America, residing at Pleasantville, county of Westchester, and State of New York, and HENRY C. SCHNAKE, a citizen of the United States of America, and residing in the city, county, and State of New York, have invented a certain new and Improved Outlet-Box Fitting, of which the following is a specification.

Our invention relates to outlet box fittings and particularly to a fitting adapted to receive an attachment plug, the object of our invention being to provide an inexpensive receptacle fitting with which a readily detachable plug connection to a branch lead from the outlet box may be established.

In the accompanying drawings,

Figure 1 is a more or less diagrammatic elevation of an instalment in which our invention is illustratively embodied;

Fig. 2 is a cross section through an outlet box showing our improved fitting in position therein and partly in section;

Figs. 3 and 4 are respectively rear and front elevations of the fitting;

Fig. 5 is a detached perspective of a terminal of the fitting.

Where an exposed conduit is employed in electrical installation, outlet boxes frequently form the supports for pendant fixtures such as lighting fixtures arranged above machines or the like. In the installation of such a fixture the connection to the main is commonly made by soldering the branch wires to the mains within the outlet box. It not infrequently happens however that these fixtures have to be changed, and when such is the case it is necessary to break the soldered connection within the outlet box and to reëstablish a like connection with the branch wires of the substituted fixture. These operations are difficult to perform in a neat and workmanlike manner and are under all circumstances time-consuming and expensive. Furthermore, it has heretofore been necessary to delay the wiring installation in a new building until the machinery is in place, in order that the outlet box and its pendant fixture may be properly located with relation to the machinery. It is awkward to work above machinery and moreover dirt and grit are apt to fall into the latter.

The present invention not only avoids the inconveniences accompanying a change of fittings, but also permits the wiring installation to be completed at any suitable time during the construction of the building and before the machinery is placed in position.

Referring to the accompanying drawings, the lighting fixture 10 comprises a pipe suspended by cap 11 from a hook 12 attached to the ceiling. A lamp 13 and reflector 14 are secured in any desired manner to the lower end of the fixture pipe. The branch wire leading to the lamp socket enters the pipe 10 through an aperture 15 in the cap 11 and carries at its outer end an attachment plug 16. The latter is adapted to coöperate with the fitting 17, to which the invention in particular relates. This fitting is mounted within the outlet box 18 of common construction and forming the terminus of the conduit 19 through which the wire mains are led to the outlet box.

The fitting 17, as here shown, comprises a block of insulation squared at one margin to fit against the bottom 20 of the outlet box and hold it against rotation and having also a circular boss 21 projecting through one of the regular knockout holes 22 in the wall of the outlet box. The boss 21 is preferably provided with an external thread 23 adapted to receive a lock nut 24 between which and the wall of the outlet box is interposed an insulating washer 25. Wire terminals 26 and 27 are mounted upon the inner face of the insulating block and afford means for connecting thereto the mains 28. The terminal plates 26 and 27 are preferably arranged substantially parallel to the base of the outlet box and the binding screws tapped therethrough in a direction such that when the fitting is installed the heads of the screws are readily accessible from the open face of the box in order to facilitate the attachment of the wires 28. The boss 21 of the fitting is perforated not only to receive the receptacle terminals 29 and 30, riveted to the bases of the wire terminals, but also to afford contact chambers into which the terminals of the attachment plug 16 may enter to engage the receptacle terminals 29 and 30. As here shown, these chambers are independent of each other.

In order to prevent possible detachment of the attachment plug 16, owing to vibration, we provide a cap 31, the skirt of which is internally threaded at 32 to engage the thread 23 on the boss 21. Thus after the terminals of the attachment plug have been shoved home within the contact chambers of the boss 21 and electrical connection with the terminals 29 and 30 established, the cap 31 may be pushed down over the plug and screwed onto the boss 21, thus holding the plug against accidental detachment.

When it is desired to change a lighting fixture 10 it is only necessary to unscrew the cap 31, withdraw the attachment plug 16, and lift the fixture from its supporting hook 12, whereupon a new fixture may be substituted and its attachment plug inserted in the boss 21 to establish connection to the mains.

It is obvious that the conduit installation and the outlet boxes 18, with the fittings 17 in place therein, may be installed at any convenient time during the erection of the building, while the supporting hooks 11 may be located after the machinery has been installed. Sufficient wire for the attachment plug 16 is provided to permit the latter to reach the nearest outlet box 18 and make connection with the fitting 17.

The fitting 17 is of such construction that it may be installed in outlet boxes of standard type and as many of the fittings as may be desired may be mounted in each outlet box, or even in the cover thereof, where the cover is provided with a knock-out aperture, as is commonly the case.

In addition to the features of advantage above mentioned, it may be further pointed out that this outlet box receptacle affords ready means for the attachment of the extension cord of the portable fixture without putting out of commission a light as is the usual practice where the extension cord plug is screwed into a lamp socket.

The suspension hook 12 for the fixture 10 may be slidably mounted on a swinging arm supported adjacent or on the receptacle. In this case a sufficient length of cord for the plug 16 would be provided to permit the hook to slide out on the arm in all positions of the latter.

We do not limit our invention to the particular details illustrated, which may be variously modified without departing from what we claim as our invention.

We claim as our invention:—

1. An outlet box fitting comprising a relatively shallow insulating body fitting against a side wall of the outlet box and having a boss projecting through an aperture in said side wall, means engaging said boss exterior to the box to hold the fitting in position, jack-receiving terminals arranged in said boss and accessible to the jacks of a coöperating attachment plug exterior to the box, and wire terminals on the body of the fitting within the box and electrically connected to said jack-receiving terminals.

2. An outlet box fitting comprising an insulating body fitting against a side wall of the outlet box, wire terminal plates projecting from the inner face of said body in a direction substantially parallel to the bottom of the box, binding screws projecting through said terminal plates toward the bottom of the box for connection to lead wires within the box, jack-receiving terminals carried by said body and arranged in register with an aperture in the wall of the box against which the body rests, and means for securing said body in position within the box.

3. An outlet box fitting comprising a relatively shallow insulating body fitting against a perforated side wall of the outlet box and having a boss projecting through said aperture, means exterior to the box engaging said boss to hold the fitting in position, wire terminal plates projecting from the inner face of said body substantially parallel to the bottom of the box, jack-receiving terminals arranged in said boss and accessible to the jacks of a coöperating attachment plug exterior to the box, said jack-receiving terminals and wire terminals being electrically connected.

4. An outlet box fitting comprising a relatively shallow insulating base fitting against the side wall of the box and having on its outer face a boss adapted to project through an aperture in the wall of the outlet box, said base and boss being perforated in register, a wire terminal plate mounted on the inner face of said base and a receptacle terminal extending therefrom into said perforation to coöperate with the jack of a coöperating plug together with means for securing said base in position within the box.

5. An outlet box fitting comprising a relatively shallow insulating base having on its outer face a boss adapted to project through an aperture in the wall of the outlet box, said base and boss being perforated in register, a wire terminal plate mounted on the inner face of said base and a receptacle terminal extending therefrom into said perforation to coöperate with the jack of a coöperating plug, together with a clamping ring screwed on said boss exterior to the wall of the box and serving to secure said base in position therein.

6. An outlet box fitting comprising a relatively shallow insulating base having on its outer face a boss adapted to project through an aperture in the wall of the outlet box, said base and boss being perforated in register, a wire terminal plate mounted on the inner face of said base and a receptacle terminal extending therefrom into said perforation to coöperate with the jack of a coöperating plug, said wire terminal plate having a portion thereof extending substantially parallel to the bottom of the box and a binding screw tapped into said portion of the plate.

7. An outlet box fitting comprising an insulating body having a flat edge adapted to lie against the bottom of the box and prevent swiveling of the fitting within the box, an externally threaded boss on said body adapted to project through an aperture in the wall of the box, a clamping nut threaded on the boss to hold the fitting in position, wire terminals on the fitting within the box and receptacle contacts electrically connected therewith and projecting into said boss, said contacts being accessible to the contacts of a coöperating attachment plug external to the box, substantially as described.

8. An outlet box fitting comprising an insulating body fitting within the outlet box and having an externally threaded boss adapted to project through an aperture in the wall of the box, receptacle contacts carried by the fitting and accessible to the contacts of a coöperating attachment plug, together with a screw cap completely inclosing the body of said attachment plug and having a threaded engagement with said boss to hold the plug in assembled position with relation to the fitting.

In testimony whereof we have signed our names to this specification, in the presence of two subscribing witnesses.

ALLAN COGGESHALL.
HENRY C. SCHNAKE.

Witnesses:
R. E. HABEL,
Z. METZGER.